US007967335B2

(12) United States Patent
Bergmeier et al.

(10) Patent No.: US 7,967,335 B2
(45) Date of Patent: Jun. 28, 2011

(54) THREE-WHEELED VEHICLE, IN PARTICULAR INDUSTRIAL TRUCK COMPRISING A STABILIZING DEVICE

(75) Inventors: Stefan Bergmeier, Langenpreising (DE); Carsten Schoettke, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 170 days.

(21) Appl. No.: 12/328,153

(22) Filed: Dec. 4, 2008

(65) Prior Publication Data

US 2009/0145696 A1 Jun. 11, 2009

(30) Foreign Application Priority Data

Dec. 6, 2007 (DE) ......................... 10 2007 058 694

(51) Int. Cl.
*B60R 21/13* (2006.01)
*B60S 9/00* (2006.01)

(52) U.S. Cl. ......... 280/755; 280/762; 180/210; 180/271

(58) Field of Classification Search .................... 180/41, 180/210, 211, 213, 271, 282, 290; 280/6.15, 280/755, 6.153, 762; 296/184.1, 187.01, 296/187.03
See application file for complete search history.

(56) References Cited

U.S. PATENT DOCUMENTS 2,909,377 A * 10/1959 Ulinski ........................... 280/62
3,851,982 A * 12/1974 See ............................... 403/224
5,259,721 A * 11/1993 Sato et al. ..................... 414/620
5,353,988 A * 10/1994 Gallenberg ................... 239/164
5,368,322 A * 11/1994 Korpimaa .................... 280/6.15
5,467,838 A * 11/1995 Wu ............................... 180/209
5,490,755 A 2/1996 Billottle
5,641,261 A * 6/1997 Talbert et al. ................. 414/544
5,826,889 A * 10/1998 Eden .......................... 280/6.153
6,273,203 B1 * 8/2001 Paggi et al. ................ 180/89.13
6,948,722 B2 * 9/2005 Sproatt et al. .............. 280/6.153
7,000,927 B2 * 2/2006 Bell ........................... 280/6.153
7,029,014 B2 * 4/2006 Hamm ....................... 280/5.502
7,237,803 B2 * 7/2007 Nguyen ........................ 280/767
7,632,054 B2 * 12/2009 McGrane et al. ............. 414/475
2002/0084642 A1 * 7/2002 Dussault .................... 280/763.1
2005/0220588 A1 * 10/2005 Turnbull et al. .............. 414/467
2006/0280585 A1 * 12/2006 Passeri et al. ................ 414/667
2007/0166141 A1 * 7/2007 McGrane et al. ............. 414/558
2008/0315569 A1 * 12/2008 Sutton ........................... 280/755

FOREIGN PATENT DOCUMENTS

DE 43 03 007 C1 6/1994
DE 43 09 561 A1 9/1994
EP 1 424 306 A1 6/2004
GB 2 274 828 A 8/1994
JP 57147971 A 9/1982
JP 07187025 A 7/1995
JP 10157998 A 6/1998

* cited by examiner

*Primary Examiner* — Paul N. Dickson
*Assistant Examiner* — Barry Gooden, Jr.
(74) *Attorney, Agent, or Firm* — Rothwell, Figg, Ernst & Manbeck, P.C.

(57) ABSTRACT

The present invention relates to a three-wheeled vehicle (10), in particular industrial truck, comprising at least one stabilizing arrangement (28), which comprises a support element (40; 140) which may be fastened or is fastened to the underside of the vehicle chassis (30) of the vehicle (10) on a mounting (36) for the stabilized support of the vehicle (10) on the ground (34), when the vehicle has a tendency to tilt over. According to the invention, it is proposed that the stabilizing arrangement (28) is configured such that the support element (40; 140) may be mounted or/and may be adjusted on the vehicle (10) in a position ready for operation in which the vehicle (10) is located with its wheels (14, 18) on the ground.

20 Claims, 6 Drawing Sheets

THREE-WHEELED VEHICLE, IN PARTICULAR INDUSTRIAL TRUCK COMPRISING A STABILIZING DEVICE

The present invention relates to a three-wheeled vehicle, in particular an industrial truck, comprising at least one stabilizing arrangement which comprises a support element which may be fastened or is fastened to the underside of the vehicle chassis of the vehicle on a mounting, for the stabilized support of the vehicle on the ground when the vehicle has a tendency to tilt over.

Stabilizing devices are mounted on the vehicle for increasing the protection against three-wheeled vehicles, in particular industrial trucks, tilting over when cornering. In this case, in a known stabilizing device, a steel cylinder is screwed from below to a vehicle chassis, the ground clearance being able to be adjusted by adjusting washers which are arranged between the vehicle chassis and the steel cylinder. The steel cylinder and the adjusting washers respectively comprise a central bore through which a threaded bolt is passed and screwed to the vehicle chassis. The screw head to be actuated by a tool thus faces the ground, so that it is not accessible for tools when the vehicle is located on the ground. If, therefore, for example a stabilizing device has to be dismantled due to damage or wear, or an adjusting washer inserted or removed, it is necessary for the vehicle to be raised. A subsequent adjustment and/or alignment is then necessary if wear occurs on the drive wheel or the stabilizing device itself and a certain minimal ground clearance is no longer ensured.

It is the object of the invention to provide an easily mountable and adjustable stabilizing device for a three-wheeled vehicle, in particular an industrial truck.

This object is achieved in that the stabilizing arrangement in a generic three-wheeled vehicle is configured such that the support element may be mounted and/or adjusted on the vehicle in a position ready for operation in which the vehicle is located with its wheels on the ground.

Such an arrangement of the stabilizing device on the vehicle chassis is made possible by the stabilizing device being able to be mounted and adjusted on the vehicle without raising the vehicle, so that time may be saved during mounting and during maintenance operations.

Preferably, the support element is supported fixedly in terms of rotation in the mounted state on the mounting or/and on the vehicle chassis. As a result, it is ensured that a rotation of the support element relative to the mounting and/or to the vehicle is prevented when the vehicle, for example when cornering, has a tendency to tilt over and is at least briefly supported on the support element of the stabilizing arrangement. During this supporting time, the support element is displaced along the surface of the ground so that, in addition to the supporting forces which act, frictional forces also act on the support element, which exert a torque on the support element.

According to one advantageous embodiment, the mounting comprises two limbs extending downwards, between which the support element is received. In this connection, the limbs are preferably aligned in the longitudinal direction and/or in the main direction of travel of the vehicle and/or industrial truck, so that, when the vehicle is located on the ground, the support element may be inserted from the front or from the rear into the mounting.

Preferably, the two limbs comprise one respective bore, which are substantially aligned with one another and through which a screw arrangement securing the support element on the mounting is guided.

The support element may be a cuboidal or prism-shaped block and preferably comprises at least six outer surfaces. In this case the outer surfaces comprise a bottom surface and a top surface of the prism-shaped support element, which in the mounted state on the mounting extend substantially parallel to the limbs of the mounting. So that the support element with the aforementioned screw arrangement may be secured to the mounting, it preferably comprises a bore extending at right angles to the bottom surface and to the top surface, through which the screw arrangement is passed.

In such an arrangement of the support element on the mounting, the bottom surface and the top surface thus face inwards and/or outwards and peripheral surfaces of the prism face upwards and/or downwards and/or to the front and/or to the rear.

According to a particularly preferred embodiment, the prism-shaped support element may be adjusted into different installation positions, depending on the desired ground clearance. In this connection, as a result of different installation positions, the wear on the steering/drive wheel of the vehicle has to be taken into account, so that with increasing wear the installation position of the support element may be altered in order to ensure the ground clearance necessary for the operation.

In a particularly preferred embodiment, the prism-shaped support element comprises pairs of peripheral surface portions consisting of diametrically opposed peripheral surface portions, in each installation position a peripheral surface portion of a relevant pair of peripheral surface portions being adjusted as a supporting surface portion on the vehicle side and the other peripheral surface portion of said pair of peripheral surface portions being adjusted as a supporting surface portion on the ground side. The respective supporting surface portions on the vehicle side thus bear against the mounting or/and against the vehicle chassis according to the installation position of the support element, so that the support element is supported thereon fixedly in terms of rotation. If the vehicle has a tendency to tilt over, for example during cornering, depending on the installation position of the support element a corresponding supporting surface portion on the ground side comes into contact with the ground so that the vehicle is protected against tilting over by said pair of peripheral surface portions, the supporting surface portion thereof on the vehicle side bearing against the vehicle chassis and/or the mounting.

So that in each of the different installation positions it is possible for the supporting surface portions on the vehicle side to bear against the mounting and/or against the vehicle chassis, it is proposed that the supporting surface portions on the vehicle side are at substantially the same distance at right angles from the axis of the bore. This construction allows the support element with the released screw arrangement to be able to be aligned with the desired supporting surface portion on the vehicle side toward the vehicle underside and the corresponding supporting surface portion on the ground side of the pair of peripheral surface portions to be used when the vehicle has a tendency to tilt over.

It is particularly preferred that a first distance line, which extends at right angles between the two peripheral surface portions of a relevant pair of peripheral surface portions and intersects the bore axis at right angles, has a different length from a further distance line, which extends at right angles between the two peripheral surface portions of a further pair of peripheral surface portions and intersects the bore axis at right angles. As the supporting surface portions on the vehicle side are at substantially the same distance at right angles from the axis of the bore, it results from this arrangement that each pair of peripheral surface portions is at a different distance at right angles between the two peripheral surface portions, the supporting surface portions on the ground side being respectively at different distances at right angles from the bore axis. In other words, depending on the installation position between a relevant supporting surface portion on the ground side and the ground, a variable clearance i.e. a variable ground clearance may be set. In other words, the support element in a new vehicle with an unworn steering/drive wheel may be fastened to the mounting in a first installation position, in which a desired ground clearance is present between the supporting surface portion on the ground side and the ground. With increasing wear on the steering/drive wheel the supporting surface portion on the ground side approaches the ground, i.e. the ground clearance becomes less and, when the wear is sufficiently great, the support element may be moved into a different installation position, so that a supporting surface portion on the ground side is set which is at a shorter distance at right angles from the bore axis, whereby the ground clearance may be increased again to a substantially original value in spite of wear to the wheel.

The two peripheral surface portions of a relevant pair of peripheral surface portions are preferably parallel to one another, preferably having approximately the same sized area. As a result of the distances, disclosed above, at right angles between the bore axis and the supporting surface portions on the vehicle side and the distances from the supporting surface portions on the ground side, the bore axis extends eccentrically to an axis parallel to the bore axis through the centre of gravity of the prism-shaped supporting element.

The mounting of the support element on the vehicle may, according to one embodiment, be designed as an adapter which comprises a base in contact with the underside of the vehicle chassis, which comprises an opening through which the support element comes into contact with the underside of the vehicle chassis. By such an arrangement, the support element may be dimensioned to be larger, as it may be enlarged by the thickness of the base of the adapter, so that one respective supporting surface portion on the vehicle side is substantially flush with the upper face of the adapter base, so that the adapter together with the support element fastened thereto bear against the underside of the vehicle chassis in a substantially planar manner.

The base of the adapter preferably comprises two base portions located on both sides of the opening, which respectively comprise at least one bore, through which the adapter is connected to the vehicle chassis by means of a screw arrangement. In this connection, the screw connection may be made with the vehicle chassis from above, i.e. through the vehicle chassis so that this fastening of the adapter may also take place in the already mentioned position ready for operation, in which the vehicle is located with its wheels on the ground. Preferably, when fastening the adapter, the support element is already arranged on said adapter in the desired installation position, so that the adapter and the support element may be fastened together to the vehicle as a type of module.

The two base portions are preferably connected to one another by the two limbs of the mounting, said limbs extending substantially at right angles to the plane of the base, so that the two base portions together with the two limbs form a profiled part which is substantially U-shaped in cross section. The U-shaped profile formed by the limbs and the base portions is dimensioned such that the support element may be received in a substantially flush manner between the two limbs, so that in the mounted state on the adapter and/or on the vehicle it is secured and/or positively received in the transverse direction relative to the main direction of travel of the vehicle.

So that the adapter, additionally to the screw connection with the vehicle chassis, may be arranged in a twistproof manner thereon, it is proposed that each limb in the region of the opening in the base has a projection projecting towards the underside of the vehicle chassis, which engages in a corresponding recess in the vehicle chassis. With such a construction it is possible that the adapter on the vehicle chassis is fastened to the vehicle chassis by only one screw which selectively penetrates one of the base portions, as the antitwist protection is ensured by the two projections engaging substantially vertically upwards into the vehicle chassis. When the adapter is only connected on one base portion to the vehicle chassis, the support element may be removed from and/or inserted between the limbs in the direction of the other base portion. The adapter is preferably mirror-symmetrical relative to a mirror plane comprising the bore axis of the two limbs and at right angles thereto, so that the adapter may be immediately fastened to the vehicle, irrespective of its alignment.

So that the adapter is not damaged, for example by ground contact, when the vehicle possibly has a tendency to tilt over, it is proposed that the support element projects towards the ground over the mounting and/or the adapter.

Preferably, the support element is produced from metal. However, it is also conceivable to use plastics.

According to a further feature, the invention also relates to a stabilizing arrangement for a three-wheeled vehicle, in particular industrial truck, which comprises a support element which may be fastened on the vehicle side by means of a mounting for the stabilized support of the vehicle on the ground when the vehicle has a tendency to tilt over, the stabilizing arrangement being characterized in that it is configured such that the support element may be attached and/or adjusted on the vehicle side in a position ready for operation, in which the vehicle is located with its wheels on the ground. The stabilizing arrangement disclosed above in connection with the vehicle and/or industrial truck, is thus also important in terms of the invention. Preferred developments of the stabilizing arrangement are the features already described above related to the stabilizing arrangement.

The invention is described hereinafter by way of example and in a non-limiting manner with reference to an embodiment by referring to the figures, in which.

Figure 1:
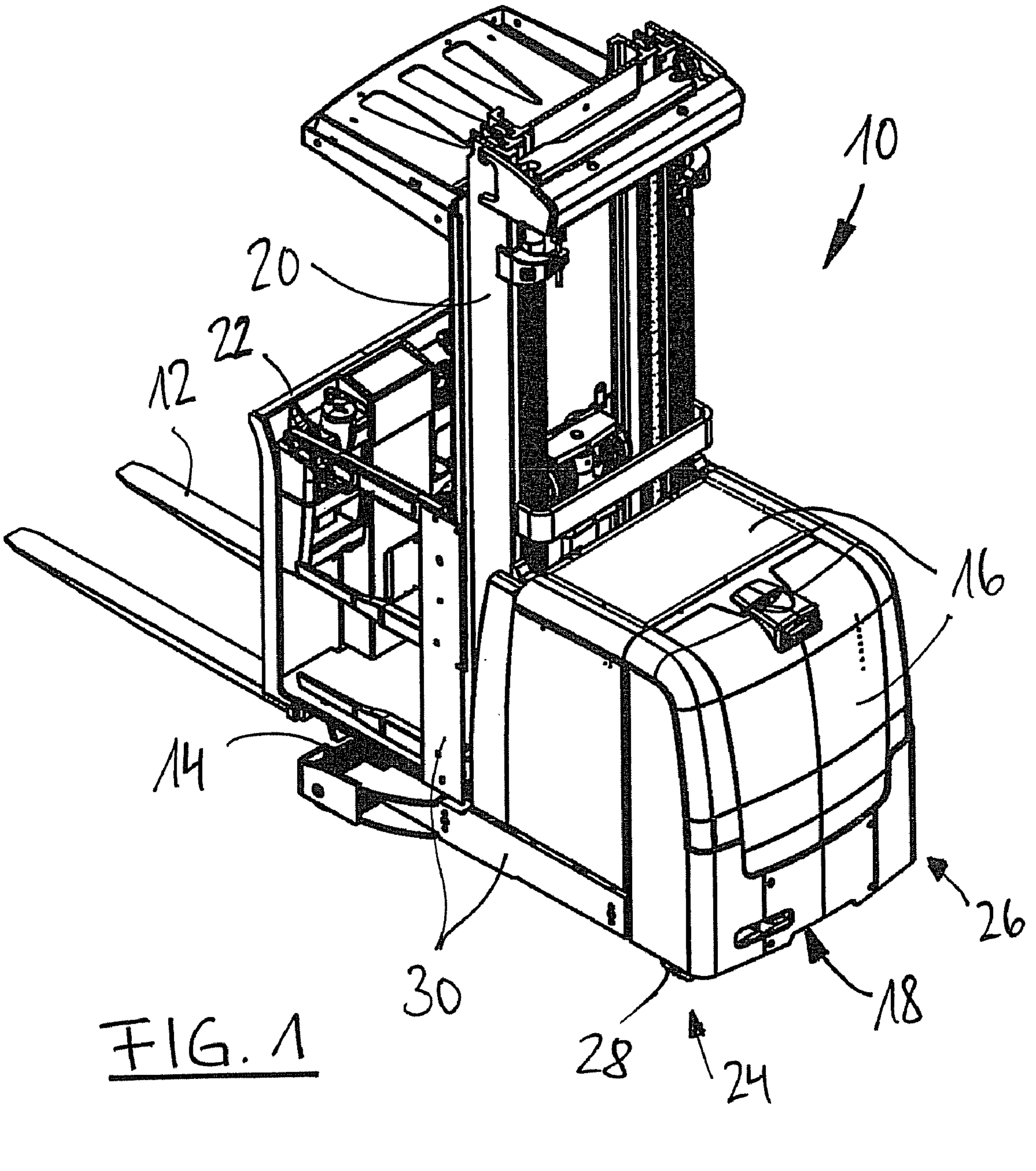
FIG. 1 is a schematic perspective view of an industrial truck with an embodiment of the stabilizing arrangement according to the invention.

In FIG. 1 an industrial truck is shown in a perspective schematic view in the form of an order picker 10. Such order pickers 10 generally have three wheels, namely relative to the alignment of a load lifting fork, two front wheels 14 which are not driven and generally also not braked, of which only one is visible, and a rear wheel 18 concealed by a housing 16, arranged centrally in the transverse direction which may be steered and is driven and braked. It is noteworthy that with such industrial trucks and/or generally with three-wheeled vehicles it also may arise that the single wheel is designed as a twin wheel, such an embodiment also acting as a three-wheeled vehicle in this specialist field.

The industrial truck 10 further comprises a lifting mast 20 and a driver's cab 22 which is vertically adjustable thereon. A battery unit which also serves as a counter weight, as well as electrical and hydraulic drive units for the operation of the industrial truck 10 are located in the housing 16. At its lower corner regions 24, 26 to the left and right relative to FIG. 1, the industrial truck has one respective stabilizing arrangement 28, in FIG. 1 only the stabilizing arrangement on the left side being shown. As the two front wheels 14 and the rear wheel 18 form three bearing points on the ground, during cornering in particular with a raised load, the higher centre of gravity of the vehicle and the centrifugal forces which act may lead to a tendency of the vehicle 10 to tilt over, which has to be supported by the stabilizing arrangement 28, so that the industrial truck 10 does not tilt over and also so that the vehicle chassis 30 and/or the housing 16 do not sustain considerable damage.

Figure 2:
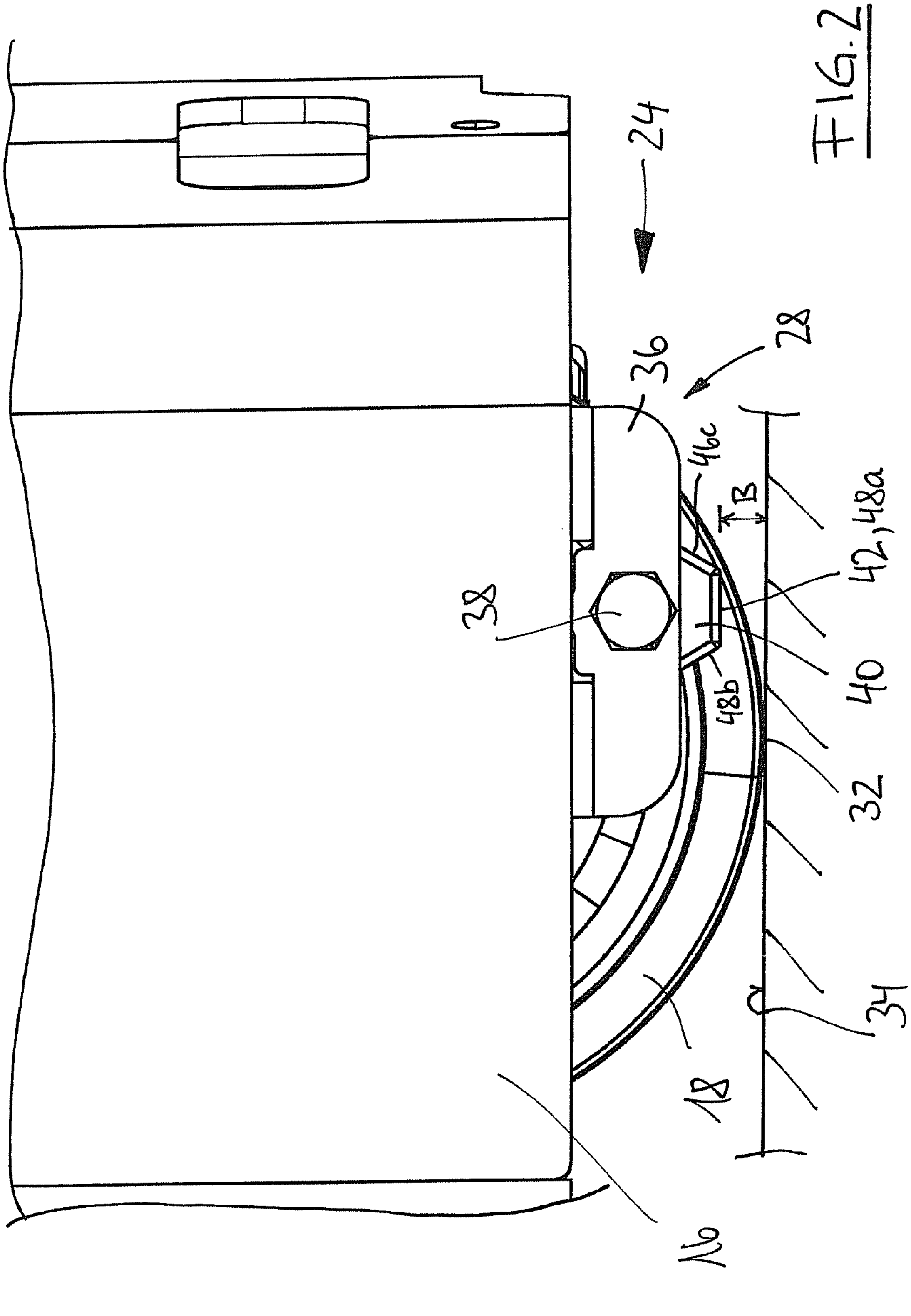
FIG. 2 is an enlarged lateral elevational view of the stabilizing arrangement attached to the industrial truck.

FIG. 2 shows a schematic lateral elevational view of the left rear corner region 24 of the industrial truck 10 according to FIG. 1. In this view, the lower part of the driven and steerable rear wheel 18 is visible, which at 32 rests on the ground 34. From this view it is further visible that on the vehicle chassis 30 which in this case is concealed by a part of the housing 16, a mounting 36 is provided which projects downward from the vehicle chassis in the direction of the ground 34. On the mounting 36 and by means of a screw arrangement 38 a support element 40 is fastened, which with an underside 42 facing the ground 34 establishes the ground clearance B of the industrial truck 10. If the industrial truck 10 should tilt over to the left, the vehicle would be supported on the underside 42 of the support element 40, the distance from the support element 40 to the ground 34 being approximately 10-20 mm.

Figure 3:
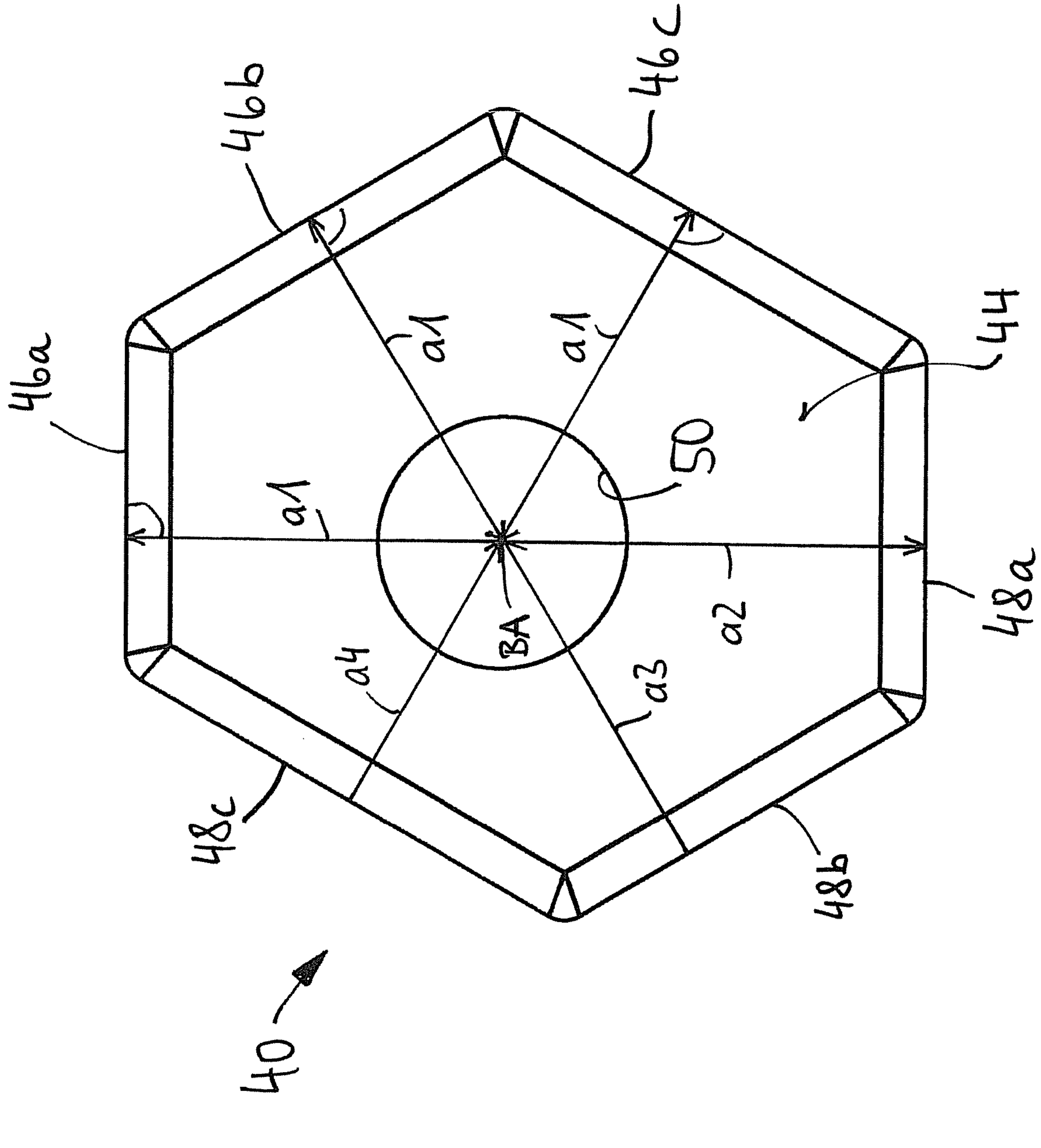
FIG. 3 is a schematic and enlarged view of a support element of the stabilizing arrangement.

The support element 40 has according to a particularly preferred embodiment, which is shown in FIG. 3, the shape of a hexagonal prism. In the plan view according to FIG. 3, a top surface 44 of the prism-shaped support element 40 is shown and six peripheral surfaces 46*a, b, c* and 48*a, b, c* are visible. Moreover, the support element 40 comprises a bore 50 penetrating the top surface 44 at right angles with its bore axis BA, which extends at right angles through the top surface 44 and the bottom surface of the prism located on the opposing side of the support element 40. The peripheral surfaces 46*a*, 46*b* and 46*c* are at a substantially identical distance a1 at right angles from the bore axis BA. Respective peripheral surfaces 48*a*, 48*b*, 48*c* diametrically oppose the peripheral surfaces 46*a*, 46*b* and 46*c*, so that in the hexagonal prism-shaped support element 40 three pairs of peripheral surfaces 46*a* and 48*a*, 46*b* and 48*b* as well as 46*c* and 48*c* are formed. The peripheral surfaces 48*a*, 48*b* and 48*c* are respectively at a different distance a2, a3 and a4 from the bore axis BA. Thus, as a result, the greatest distance, namely a1+a2, is present between the peripheral surfaces 46*a*, 48*a* forming a pair and between the two other pairs of peripheral surfaces 46*b* and 48*b* and/or 46*c* and 48*c* smaller distances, namely a1+a3 and/or a1+a4, are present (a2>a3>a4).

When the support element 40 is mounted on the mounting 36, as is shown in FIG. 2, the peripheral surface 48*a* which has been previously denoted as the underside 42, faces the ground 34. Moreover, the peripheral surfaces 46*c* and 48*b*, which project downwards at least partially over the mounting 36, are still visible. The screw arrangement 38 penetrates the bore 50 in the support element 40 and the support element 40 bears with the peripheral surface 46*a* on the underside of the vehicle chassis, so that it is secured against rotation relative to the vehicle chassis, which is described in more detail hereinafter.

Figure 4:
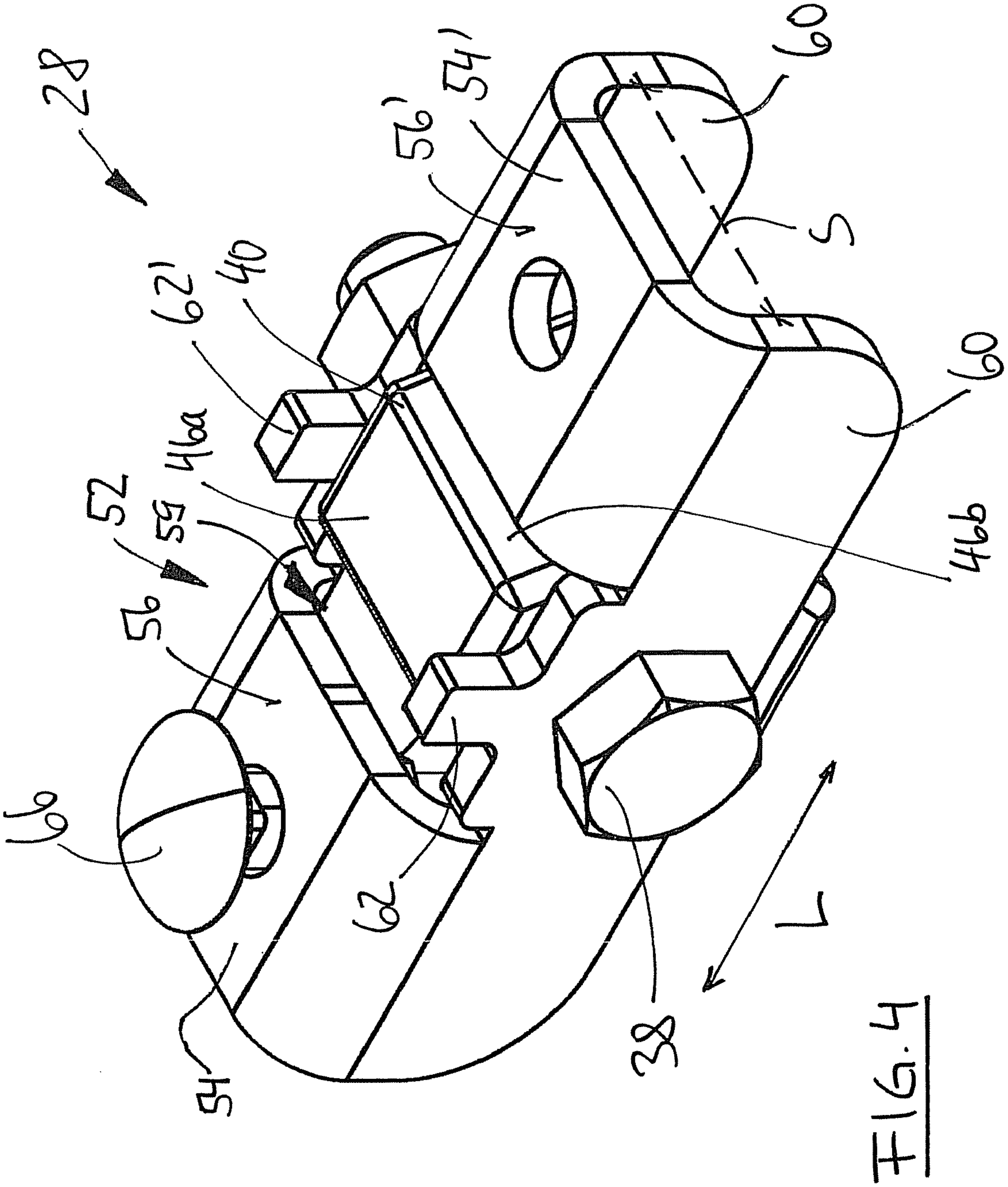
FIG. 4 is a perspective view of a mounting designed as an adapter with a support element inserted.

FIG. 4 shows in a perspective schematic view a mounting of the support element 40 designed as an adapter 52. The attachment of such an adapter 52 as well as further features of the stabilizing arrangement 28 are described below in more detail with reference to FIGS. 4 and 5.

Figure 5:
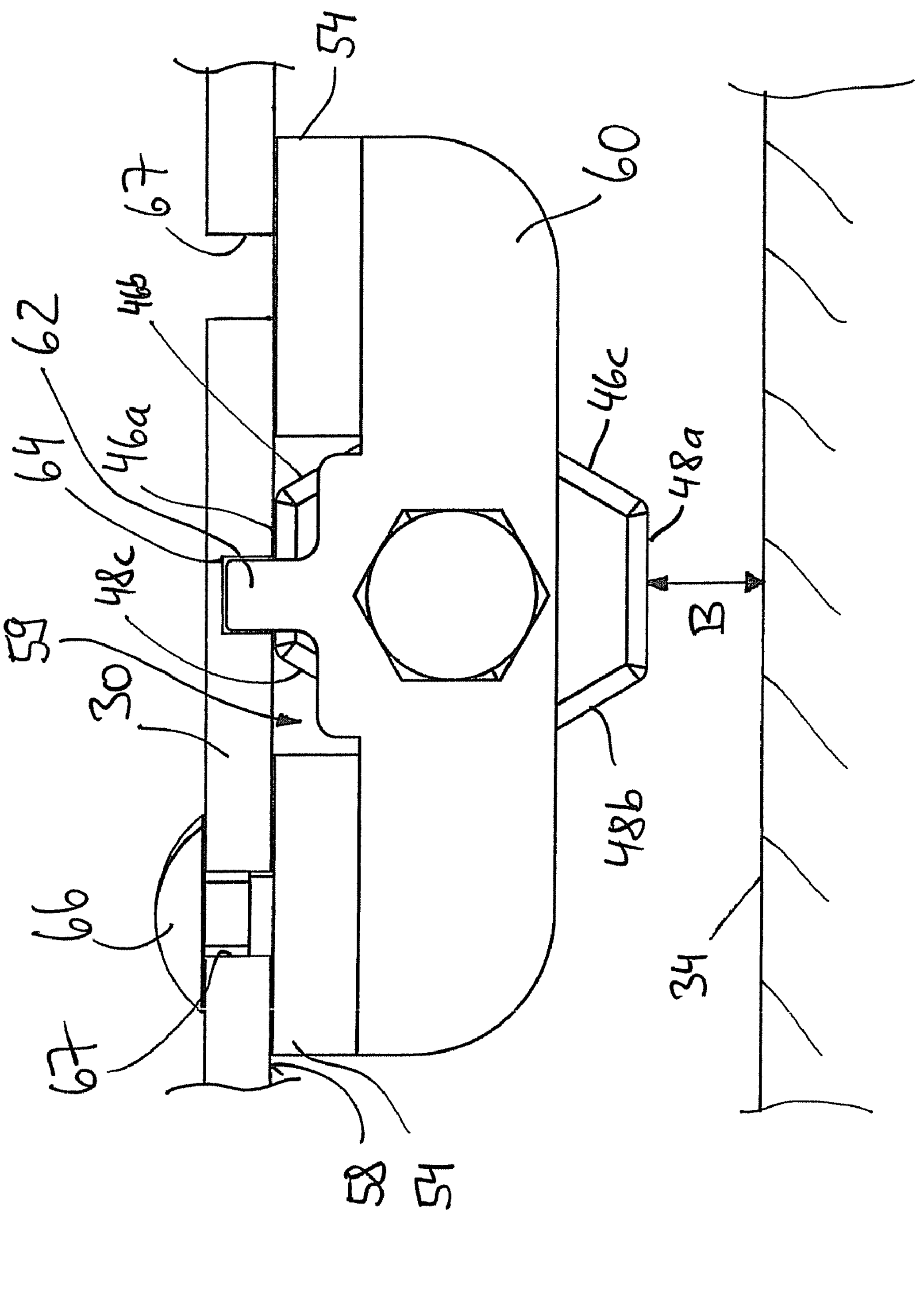
FIG. 5 is a schematic partial view of a stabilizing arrangement fastened to the vehicle chassis in the form of the adapter with the support element.

The adapter 54 has two base portions 54, 54' which bear with their upper face 56 on an underside 58 of the vehicle chassis 30 (FIG. 5). The two base portions 54, 541 define an opening 59 in the adapter 52 in which the support element 40 is located with its peripheral surface 46*a* and partially the peripheral surfaces 46*b* and 48*c*. As visible from FIGS. 4 and 5, the peripheral surface 46*a* is substantially flush with the surfaces 56, 56' of the base portions 54, 54' so that said three surfaces 56, 56' and 46*a* bear against the underside 58 of the vehicle chassis 30, when the adapter 52 is fastened to the vehicle.

The two base portions 54, 54' are connected integrally to one another via two limbs 60, 60' extending in the longitudinal direction L, so that they have in cross section a substantially U-shaped profile. In this connection, the width S between the two limbs 60, 60' is selected such that it substantially corresponds to the height of the support element 40, the height being the distance between the top surface 44 and the bottom surface of the prism 40. The limbs 60, 60' have bores in the centre of their longitudinal extension through which the screw arrangement 38 is passed, so that by this screw arrangement 38 the support element 40 may be connected to the adapter 52. In this central region of the limbs 60, 60' one respective projection 62, 62' extends in a substantially vertical direction beyond the surfaces 56, 56' of the base portions 54, 54'. These projections 62, 62' are used for receiving in a twistproof manner the adapter 52 in corresponding recesses 64 which are formed in the vehicle chassis 30. Provided such projections 62, 62' are provided on the adapter 52, the adapter 52 may be held by means of a screw arrangement 66 on the vehicle chassis 30, as shown in FIG. 5, it being preferred to fasten the adapter 52 by means of a further screw arrangement, not shown, in the region of the base portion 54'.

As visible from FIG. 5, the ground clearance B is established between the ground 34 and the peripheral surface 48*a* of the support element 40. If during operation of the industrial truck the drive wheel 18 (FIG. 2) is worn, the ground clearance B becomes smaller over time, which in operation may possibly lead to problems when driving over uneven ground or the like. The stabilizing arrangement 28 may in such a case be adapted to the new operating conditions, by the support element 40 being released from the adapter 52, by releasing the screw arrangement 38, this screw arrangement 38 being accessible from the side of the industrial truck 10, when the vehicle is located on the ground 34, and subsequently by rotating the support element into a different installation position, for example the position in which the peripheral surface 46*b* bears against the vehicle chassis 30 and the peripheral surface 48*b* opposes the ground 34. In this new installation position, the distance between the underside 58 of the vehicle chassis 30 and the peripheral surface 48*b* is a1+a3 (see FIG. 3) which is shorter than the distance a1+a2 of the original installation position of the support element 40 so that by reducing this distance, due to the installation position of the support element 40, a reduction in the ground clearance B due to wear of the wheel may be compensated. In the event of even more extensive wear on the drive wheel, the support element 40 may finally be rotated further into the third installation position, in which it bears against the vehicle chassis with the peripheral surface 46*c*, and faces the ground 34 with the peripheral surface 48*c*. When finally, after lengthy operation, a new drive wheel 18 is installed, the support element may again be moved into the first installation position on the adapter 52, so that the pair of peripheral surfaces 46*a*, 48*a* is effective when providing support against a tendency to tilt over.

The embodiment comprising the adapter 52 has the advantage that the adapter may be screwed to lateral receiver slots 67 of the vehicle chassis 30, so that together with the support element 40 it may be removed and attached again in a simple manner when the vehicle is located on the ground. Thus the alteration to the installation position of the support element 40 and also the replacement of such a support element and/or a common stabilizing arrangement 28 comprising the adapter 52 and the support element 40 is possible in a simple manner and it is not necessary to raise the industrial truck.

The alteration of the installation position of the support element 40 and subsequent adjustment of the ground clearance B is made possible by the release of the screw arrangement 38 and rotation of the hexagonal part. With the stabilizing arrangement comprising the adapter 52 and the support element 40 all screws may be reached with conventional tools without further aids, so that the operating cost is considerably reduced and the adjustment of the ground clearance and/or the replacement of such a stabilizing arrangement may also be performed at the place of use of the industrial truck.

A further advantage of the disclosed stabilizing arrangement is that hardly any constructional space is required in the vehicle. Only the screw heads of the two screw arrangements 66 for fastening the adapter 52 to the vehicle chassis 30 have to be released in the vehicle interior. It is also noteworthy that the screw arrangements 38, 66 are preferably designed as screw-nut connections, in the screw arrangement 66 a round-head screw being accommodated in a twistproof manner in the slot 67 of the floor plate, and which subsequently may be attached to the vehicle in the position ready for operation.

Figure 6:
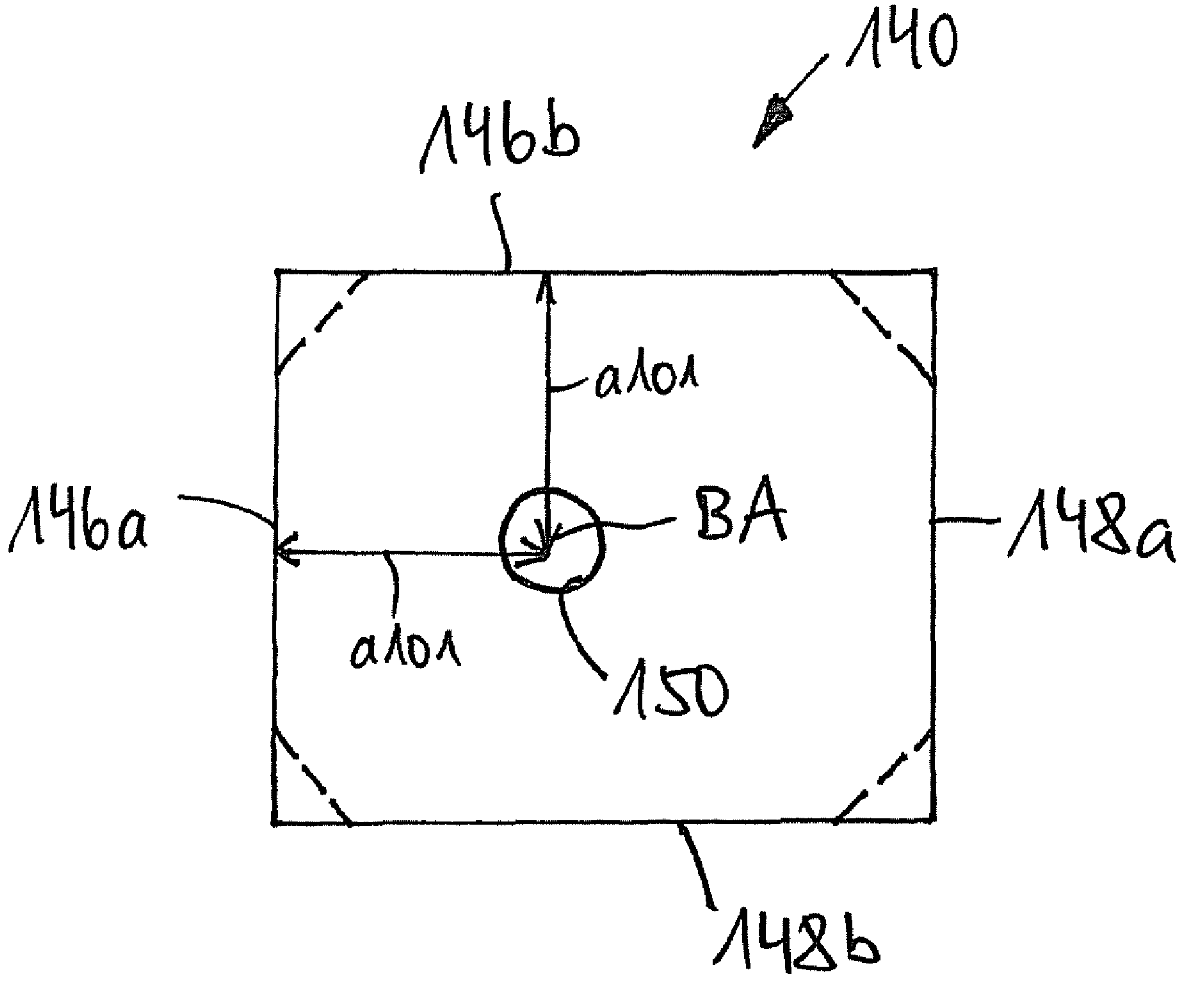
FIG. 6 is a considerably simplified schematic view of a variant of a support element.

In FIG. 6 an alternative embodiment of the support element 140 in the form of a cuboid is shown. This cuboid has four peripheral surfaces 146*a*, 146*b*, 148*a* and 148*b*, the peripheral surfaces 146*a* and 146*b* being at the same distance a101 at right angles. Similar to the preferred support element 40 according to FIG. 3 with three installation positions, such a cuboid support element 140 may be attached to the vehicle in two installation positions. Moreover, it is also conceivable, as shown in dotted lines in FIG. 6, that the corners of the cuboid are chamfered without said corners, however, forming peripheral surfaces for an installation position used for the stabilizing device.

In summary, the invention relates to a stabilizing arrangement, in which mounting and adjustment is possible without raising the vehicle and without additional aids, such as for example adjusting washers according to the prior art. In this case, a specifically designed support element in the form of a hexagonal portion is attached to a mounting, preferably premounted on an adapter. This adapter is mounted by means of, for example, two round-head screws on the vehicle chassis. At the same time, the hexagonal support element is tensioned with a peripheral surface against the vehicle floor, and is thus secured against rotation about the bore axis. Moreover, by the design of the vehicle floor with corresponding cut-outs, the insertion of the screws is possible without raising the vehicle. Moreover, in addition to the frictional connection due to the engagement of the screws in the slots in the vehicle chassis, a positive connection may be achieved by lugs protruding from the mounting. In the prism-shaped support element, with three of the six surrounding peripheral surfaces the distance from the bore axis is the same. Thus three possibilities result for the positive mounting on the vehicle. The remaining three peripheral surfaces are respectively at different distances from the bore axis, resulting in three different ground clearances. Thus a subsequent adjustment of the ground clearance is possible by rotating the hexagonal part, all screws being able to be reached with conventional tools without aids, when the vehicle is on the ground.

The invention claimed is:

1. A vehicle comprising:

a vehicle chassis; and at least one stabilizing arrangement that comprises a support element capable of being fastened or fastened to an underside of the vehicle chassis of the vehicle on a mounting, for stabilized support of the vehicle on the ground when the vehicle has a tendency to tilt over, wherein the at least one stabilizing arrangement is configured such that the support element is capable of being mounted and/or adjusted on the vehicle in a position ready for operation when the vehicle is located with its wheels on the ground; and wherein the support element is a cuboidal or a prism-shaped block and comprises at least six outer surfaces.

2. Vehicle according to claim 1, wherein the support element is supported fixedly in terms of rotation in the mounted state on the mounting.

3. Vehicle according to claim 1, wherein the mounting comprises two limbs extending downwards, between which the support element is received.

4. Vehicle according to claim 1, wherein the support element projects towards the ground over the mounting.

5. Vehicle according to claim 1, wherein the support element is produced from metal.

6. Vehicle according to claim 1, wherein the support element is a prism-shaped block, the mounting comprises two limbs, and the at least six outer surfaces comprise a bottom surface and a top surface of the prism-shaped block, wherein the top and the bottom surfaces extend in planes that are substantially parallel to the planes in which the limbs of the mounting extend.

7. Vehicle according to claim 6, wherein the support element has a bore extending at right angles relative to the plane of the bottom surface and relative to the plane of the top surface.

8. Vehicle according to claim 1, wherein the support element is a prism-shaped block, and the prism-shaped block is capable of being adjusted into different installation positions, depending on a desired ground clearance.

9. Vehicle according to claim 8, wherein the prism-shaped block comprises pairs of peripheral surface portions consisting of diametrically opposed peripheral surface portions, in each installation position a peripheral surface portion of a relevant pair of peripheral surface portions being adjusted as a supporting surface portion on the vehicle side and the other peripheral surface portion of said pair of peripheral surface portions being adjusted as a supporting surface portion on the ground side.

10. Vehicle according to claim 9, wherein the supporting surface portions on the vehicle side are at substantially a same distance in a radial direction from an axis of a bore.

11. Vehicle according to claim 9, wherein a first distance line, which extends between the two peripheral surface portions of a relevant pair of peripheral surface portions and intersects the bore axis, has a different length from another distance line, which extends between the two peripheral surface portions of another pair of peripheral surface portions and intersects the bore axis, wherein the first distance line extends in a direction perpendicular to the two peripheral surface portions of the relevant pair of peripheral surface portions and perpendicular to the bore axis, and wherein the other distance line extends in a direction perpendicular to the two peripheral surface portions of the other pair of peripheral surface portions and perpendicular to the bore axis.

12. Vehicle according to claim 9, wherein the two peripheral surface portions of a relevant pair of peripheral surface portions are parallel to one another.

13. Vehicle comprising:

a vehicle chassis; and at least one stabilizing arrangement that comprises a support element capable of being fastened or fastened to an underside of the vehicle chassis of the vehicle on a mounting, for stabilized support of the vehicle on the ground when the vehicle has a tendency to tilt over wherein the at least one stabilizing arrangement is configured such that the support element is capable of being mounted and/or adjusted on the vehicle in a position ready for operation in which the vehicle is located with its wheels on the ground;

wherein the mounting comprises two limbs extending downwards, between which the support element is received; and wherein the two limbs each comprise one bore, which are substantially aligned with one another and through which a screw arrangement securing the support element on the mounting is guided.

14. Vehicle according to claim 13, wherein the support element is a cuboidal or a prism-shaped block and comprises at least six outer surfaces.

15. Vehicle comprising:

a vehicle chassis; and at least one stabilizing arrangement that comprises a support element capable of being fastened or fastened to an underside of the vehicle chassis of the vehicle on a mounting, for stabilized support of the vehicle on the ground when the vehicle has a tendency to tilt over wherein the at least one stabilizing arrangement is configured such that the support element is capable of being mounted and/or adjusted on the vehicle in a position ready for operation in which the vehicle is located with its wheels on the ground; and wherein the mounting is designed as an adapter, which comprises a base in contact with the underside of the vehicle chassis, which comprises an opening through which the support element comes into contact with the underside of the vehicle chassis.

16. Vehicle according to claim 15, wherein the base comprises two base portions located on both sides of the opening, which respectively comprise at least one bore, through which the adapter is connected to the vehicle chassis by means of a screw arrangement.

17. Vehicle according to claim 16, wherein the mounting comprises two limbs, the two base portions are connected to one another by the two limbs that extend substantially at right angles to a plane of the base, and the two base portions together with the two limbs form a profiled part which is substantially U-shaped in cross section.

18. Vehicle according to claim 17, wherein each limb in the region of the opening in the base has a projection projecting towards the underside of the vehicle chassis, which engages in a corresponding receiver in the vehicle chassis.

19. Stabilizing arrangement for a vehicle, the stabilizing arrangement comprising a support element capable of being fastened on a vehicle side by means of a mounting for stabilized support of the vehicle on the ground when the vehicle has a tendency to tilt over, wherein the stabilizing arrangement is configured such that the support element is capable of being attached and/or adjusted on the vehicle side in a position ready for operation, when the vehicle is located with its wheels on the ground; and wherein the support element is a cuboidal or a prism-shaped block and comprises at least six outer surfaces.

20. Stabilizing arrangement according to claim 19, wherein the support element is supported fixedly in terms of rotation in a mounted on the mounting.

* * * * *